(12) United States Patent
Landis et al.

(10) Patent No.: US 7,931,401 B2
(45) Date of Patent: Apr. 26, 2011

(54) TEMPERATURE SENSOR

(75) Inventors: Ronald N. Landis, Bellville, OH (US); Robert J. Sparks, Bellville, OH (US); Jeffrey T. Norris, Lexington, OH (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 12/389,739

(22) Filed: Feb. 20, 2009

(65) Prior Publication Data

US 2009/0151859 A1    Jun. 18, 2009

Related U.S. Application Data

(62) Division of application No. 11/692,679, filed on Mar. 28, 2007, now Pat. No. 7,682,076.

(60) Provisional application No. 60/743,856, filed on Mar. 28, 2006.

(51) Int. Cl.
*G01K 7/00* (2006.01)
*G01K 9/00* (2006.01)

(52) U.S. Cl. .................. 374/208; 374/163; 374/183

(58) Field of Classification Search .................. 374/185, 374/208, 163
See application file for complete search history.

(56) References Cited

U.S. PATENT DOCUMENTS

| | | | |
|---|---|---|---|
| 3,621,204 A | 11/1971 | Neidhardt et al. | |
| 3,813,771 A | 6/1974 | Skogland | |
| 4,101,760 A | 7/1978 | Roller | |
| 4,280,932 A | 7/1981 | Borom et al. | |
| 4,639,712 A | 1/1987 | Kobayashi et al. | |
| 5,209,571 A | 5/1993 | Kendall | |
| 5,309,133 A * | 5/1994 | Berger et al. | 338/22 R |
| 5,889,460 A | 3/1999 | Bachmann et al. | |
| 6,069,910 A | 5/2000 | Eckert | |
| 6,121,577 A | 9/2000 | Jakobi et al. | |
| 6,305,841 B1 | 10/2001 | Fukaya et al. | |
| 7,060,949 B1 * | 6/2006 | Davis et al. | 219/536 |
| 2004/0075527 A1 | 4/2004 | Zitzmann et al. | |
| 2004/0101028 A1 * | 5/2004 | Iwaya et al. | 374/163 |
| 2004/0218662 A1 | 11/2004 | Hanzawa et al. | |
| 2005/0129089 A1 | 6/2005 | Glozman | |
| 2007/0171959 A1 | 7/2007 | Irrgang | |
| 2008/0080592 A1 | 4/2008 | Houben et al. | |
| 2008/0205484 A1 | 8/2008 | Toudou et al. | |

FOREIGN PATENT DOCUMENTS

JP    54150751    11/1979

OTHER PUBLICATIONS

International Search Report and Written Opinion dated Dec. 18, 2008 issued in related International Patent Application No. PCT/US07/65338.
Chinese Office Action dated Feb. 12, 2010 issued in related Chinese Patent Application No. 200780018270.3.

* cited by examiner

*Primary Examiner* — Lisa M Caputo
*Assistant Examiner* — Mirellys Jagan
(74) *Attorney, Agent, or Firm* — Grossman, Tucker, Perreault & Pfleger, PLLC

(57) ABSTRACT

A temperature sensor including a housing and a temperature sensing element at least partially disposed in the housing. A particulate media, which may include a blend of differently sized particles, is disposed in the housing and at least partially surrounds the temperature sensing element. The particulate media may entrain oxygen to avoid a reducing atmosphere in said housing.

8 Claims, 2 Drawing Sheets

TEMPERATURE SENSOR

CROSS-REFERENCE TO RELATED APPLICATIONS

This application is a divisional of U.S. patent application Ser. No. 11/692,679, filed Mar. 28, 2007 which and claims the benefit of U.S. Provisional Application Ser. No. 60/743,856, filed Mar. 28, 2006, the teachings of which applications are hereby incorporated herein by reference.

FIELD

The present invention generally relates to temperature sensors, and more particularly includes but is not limited to temperature sensors for detecting exhaust gas temperature.

BACKGROUND

Thin film resistive temperature detectors are a variety of temperature sensor used for detecting temperature in many applications, including but not limited to effluent or emissions from an engine. For example, such detectors may be used for detecting the exhaust gas temperature of an internal combustion engine. The exhaust gas temperature sensor may be part of an engine management system. Various operating parameters, such as fuel delivery, etc., may be adjusted based in part on a measured exhaust gas temperature.

Platinum metal film resistive temperature detectors are one particular variety of temperature sensor used for detecting effluent temperature. The platinum metal resistive element used in such temperature detectors is sensitive to environmental conditions. For example, a reducing atmosphere may cause migration of the platinum film of the resistive element from its substrate if oxygen in the surrounding atmosphere is below a threshold concentration. Significant loss of platinum from the resistive temperature detector resulting from decomposition or migration of the platinum may adversely affect the performance and life of the temperature detector.

The interior surfaces of a closed, or encapsulated, temperature sensor may react with the trapped oxygen in the closed environment, thereby reducing the oxygen concentration and leaving the platinum resistive element susceptible to damage from the resulting reducing environment. The volume of air which may be contained within the closed temperature sensor may be limited because too great an internal volume may insulate the resistive temperature detector element from the exterior of the sensor, greatly increasing the thermal response time and reducing the performance of the sensor. Because of the restrictions on the internal volume of the enclosure, even if the interior surfaces of the enclosure have been pre-oxidized prior to final assembly of the sensor, further oxidation of the interior surfaces and/or contaminates may still reduce the oxygen concentration leaving the platinum resistive element susceptible to damage.

Open temperatures probes, which do not provide a closed environment, are open to the outside atmosphere to allow oxygen exchange with the platinum film of the temperature detector in order to prevent the loss or migration of the metal film in the presence of a reducing atmosphere. While the open design may allow communication with the external atmosphere, the external atmosphere may not, necessarily, provide a sufficient oxygen concentration to prevent the loss of, or damage to, the thin film resistive element. Additionally, the open design may allow the entrance of contaminants, such as soot, dust, combustion byproducts, etc. Such contaminants may react with, attack, inhibit or otherwise negatively affect the substrate, the platinum film, the thermal response time, etc., of the temperature detector.

BRIEF DESCRIPTION OF THE DRAWINGS

Features and advantages of the present invention are set forth by the description of embodiments consistent therewith, which description should be considered in conjunction with the accompanying drawings, wherein.

DESCRIPTION

The present invention is generally directed at temperature sensors. According to particular embodiments, a temperature sensor is described which may suitably be employed for detecting an exhaust gas temperature, such as an exhaust gas temperature of an internal combustion engine, turbine (jet propulsion), fuel cell or other application where the measurement of temperature is necessary. A temperature sensor consistent with the present disclosure may, however, be employed in connection with various other applications, both related to, and unrelated to, vehicles.

Figure 1:
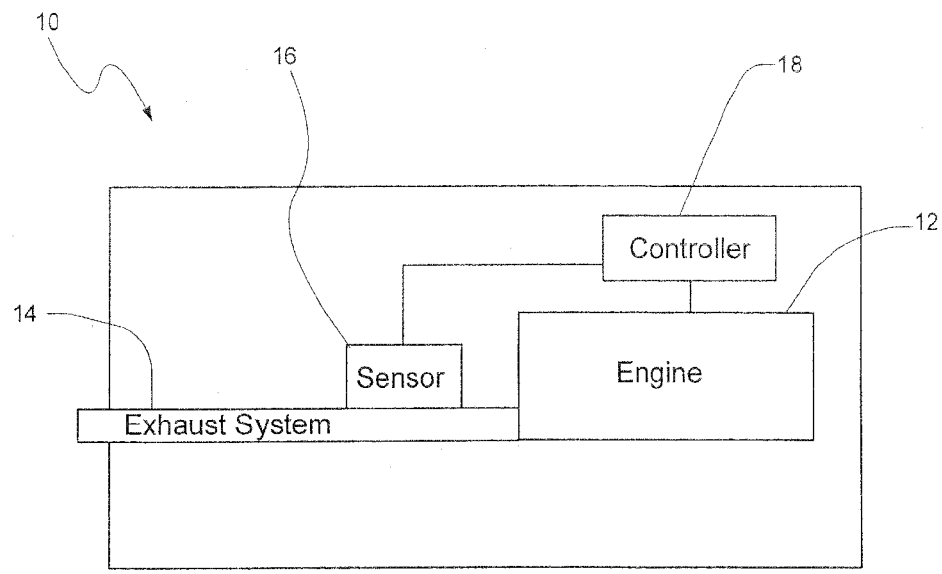
FIG. 1 is a schematic illustration of a vehicle including a temperature sensor consistent with the present invention.

Referring to FIG. 1 an embodiment of a vehicle 10 is schematically depicted. The vehicle 10 may include an internal combustion engine 12 having an exhaust system 14 which may carry a flow of exhaust gasses from the engine 12. A temperature sensor 16 may be coupled to the exhaust system 14 for measuring a temperature of the exhaust gasses carried by the exhaust system 14. The temperature sensor 16 may provide an output responsive to, or indicative of, a temperature of the exhaust gasses. A vehicle control system 18, such as an engine control module, etc., may receive the output from the temperature sensor 16. The engine control system 18 may vary one or more operating parameters, such as fuel delivery, fuel/air ratio, etc., in response to the output of the temperature sensor 16

Figure 2:
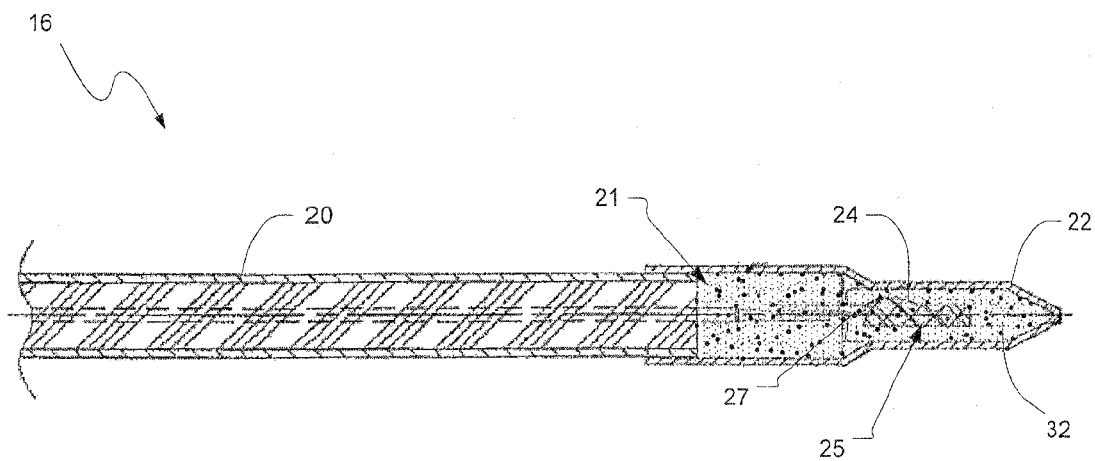
FIG. 2 is a side cross-sectional view of an embodiment of a temperature sensor consistent with the present invention.
Figure 3:
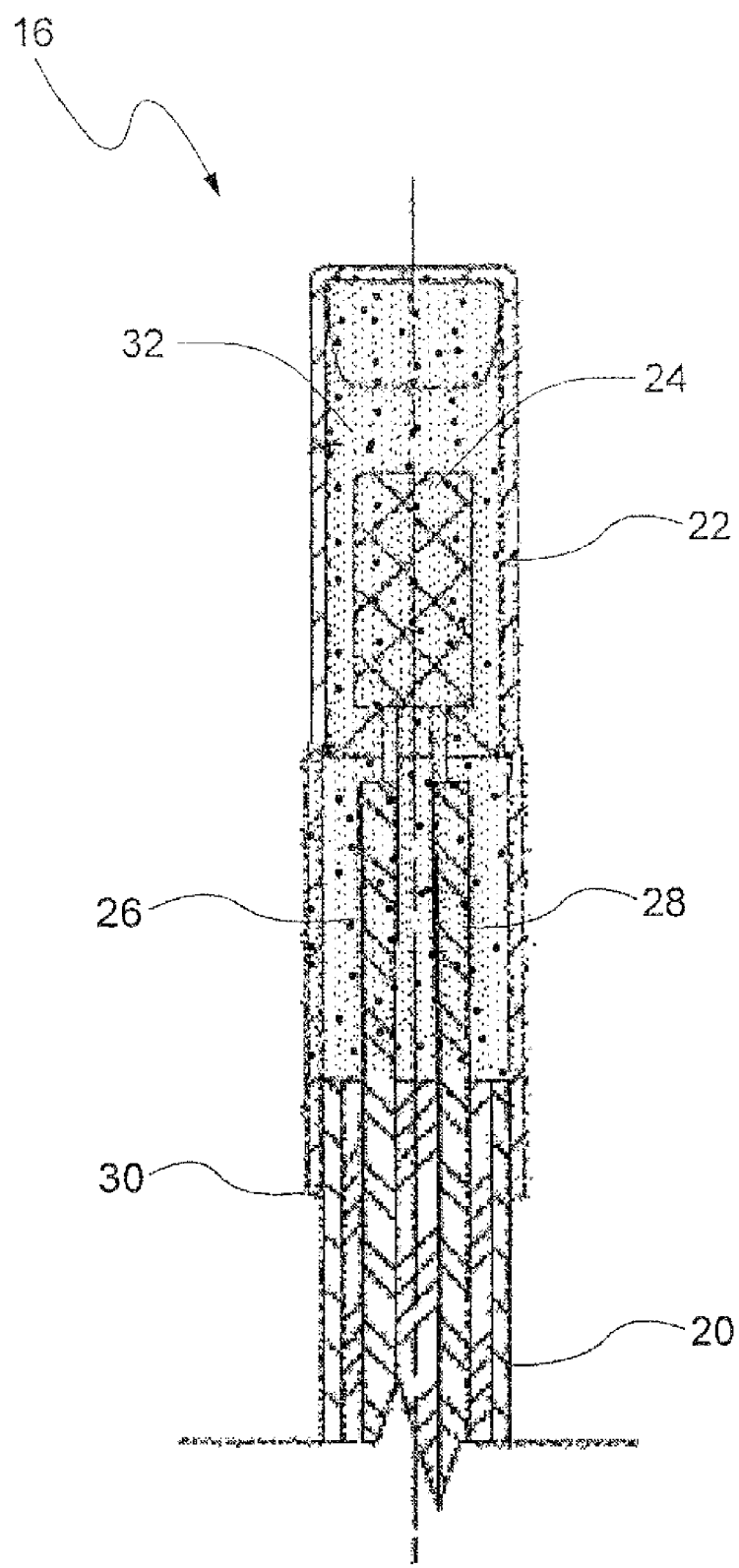
FIG. 3 is a front cross-sectional view of the temperature sensor shown in FIG. 2.

Turning to FIGS. 2 and 3, a portion of an embodiment of a temperature sensor 16 consistent with the present invention is shown in side and front cross-sectional views. The temperature sensor 16 may generally include a longitudinal body 20 having a housing 22 disposed at one end of the body 20. A temperature sensing element 24 may be disposed at least partially within the housing 22. Electrical connections 26, 28 for the temperature sensor 16 may extend from the temperature sensing element 24 and through the body 20. While not shown, the temperature sensor may also include various mounting features, such as a flange and mounting nut, a compression ferrule, etc., capable of mounting the temperature sensor extending at least partially into an exhaust system while maintaining a generally sealed condition of the exhaust system. Similarly, the temperature sensor may include electrical connectors or contacts electrically coupled to the electrical connections for the temperature sensor. Suitable connectors may include integral features as well as pigtail connectors, etc.

The temperature sensing element 24 may be a resistive temperature sensing element, in which the electrical resistance through the element may vary as a function of temperature. In a particular embodiment, the temperature sensing element 24 may be a thin film resistive temperature detector including at least one metal film 25, e.g. a platinum film, film disposed on a substrate 27. Various temperature sensing elements may also be used in connection with the present invention, such as thermocouples, etc.

As shown, the housing 22 may define an interior volume 21. The temperature sensing element 24 may be at least partially disposed within the interior volume defined by the housing 22. As such, the temperature sensing element 24 may be at least partially encapsulated by the housing 22. The housing 22 may be coupled to the body 20 of the temperature sensor 16 at an open end 30 of the housing 22. In one embodiment, the housing 22 may be coupled to the body 20 to provide a generally gas tight seal, thereby placing the temperature sensing element 24 in a generally closed environment. The generally closed environment may reduce or eliminate exposure of the temperature sensing element 24 to contaminants, etc., of the exterior environment.

The closed atmosphere provided by the housing 22 may prevent or reduce exposure of the temperature sensing element 24 to contaminants. Correspondingly, the generally closed environment provided by the housing 22 may at least partially maintain or control the environment immediately around the temperature sensing element 24. In the context of a platinum metal film resistive temperature detector, or similarly susceptible element, the interior volume provided by the housing 22 may allow a sufficient quantity of oxygen to be present in the interior atmosphere of the temperature sensor 16 to reduce the degradation, or the rate of degradation, of the temperature sensing element 24.

A particulate media 32 may be disposed within the housing 22, and may at least partially surround the temperature sensing element 24. The particulate media 32 may be provided in flake, granular, power, etc. form without limitation. A wide variety of materials may suitably be employed as a particulate media 32 in connection with the present disclosure. In one embodiment, the particulate media 32 may be a material which is not adversely affected by the desired operating temperatures of the temperature sensor 16. The particulate media also may not adversely affect the life or performance of the temperature sensing element 24. According to an exemplary embodiment, the particulate media 32 may be magnesium oxide, alumina, calcium oxide, titanium oxide, manganese oxide, or boric oxide, or combinations thereof, or any material or combination of materials with interstices significant in morphology to allow entrapment of permeable gas(es) between spacing thereof. In other embodiment, the particulate media may include other materials, such as ceramics, metallic materials, etc.

The particulate media 32 at least partially surrounding the temperature sensing element 24 may at least partially support the temperature sensing element 24 within the housing 22. The particulate media 32 at least partially surrounding the temperature sensing element 24 may limit movement of the temperature sensing element 24. The support of the temperature sensing element 24 by the particulate media 32 may limit mechanical loading and physical stresses placed on the temperature sensing element 24, e.g., due to vibration, shocks, etc. The temperature sensing element 24 may, therefore, be physically protected, to some degree, by the particulate media 32.

According to one aspect, the particulate media 32 may have a greater thermal conductivity than air or a gaseous medium. The particulate media 32 may, at least to some extent, overcome any insulating effect of the separation between the housing 22 and the temperature sensing element 24. The particulate media 32 may provide a thermal pathway between the housing 22 and the temperature sensing element 24, and may, thereby, increase the thermal response of the temperature sensor 16. With regard to one exemplary particulate media 32, magnesium oxide or other selected constituents may have a thermal conductivity which may generally be on the same order as carbon steel. Selected media may be low in reactivity for the environment in which it is enclosed, or may react in a manner that is predictable and quantifiable. Specific or comparative values or ranges of thermal conductivity should not be construed as limiting, as various materials having a wide range of thermal conductivities may suitably be employed. Considerations to a plurality of particulate sizes and sort of said particles may be made.

In addition to providing a thermal pathway between the housing 22 and the temperature sensing element 24, the particulate form of the media 32 may provide an interstitial volume, i.e., a volume between the discrete particles. The interstitial volume of the particulate media 32 may allow a volume of oxygen to be entrained in the particulate media 32. The volume of oxygen entrained in the interstitial volume of the particulate media 32 may be present as pure oxygen gas, or may be provided in mixture with other constituents. For example, air, including a volume fraction of oxygen, may be entrained in the interstitial volume of the particulate media 32. The oxygen entrained in the particulate media 32 may allow the loss of a quantity of oxygen, e.g., to oxidation of the housing, etc., while still maintaining a sufficient quantity of oxygen within the interior volume of the housing 22 to prevent or delay degradation of the temperature sensing element (or any element which is negatively impacted by a reducing atmosphere or conditions as previously described) in a reducing atmosphere. A reducing atmosphere as used herein occurs when oxygen in the housing is below threshold concentration thereby resulting in migration a portion of sensing element structure, e.g. a metal film, from an associated substrate.

The particulate media 32 may be produced from a material which exhibits a relatively low reactivity with oxygen. A low reactivity with oxygen may not tend to consume the oxygen contained within the housing 22, leaving the oxygen to prevent or reduce the degradation of the temperature sensing element 24. Consistent with the above-mentioned particulate media, magnesium oxide or other selected constituents may suitably exhibit a very low reactivity with oxygen, even at elevated temperatures. Various other materials, including ceramic materials and refractory materials, etc., may also exhibit a relatively low reactivity with oxygen.

Consistent with any of the foregoing aspects of the particulate media 32, the size and size distributions (i.e. range of particle sizes) of the particulate media 32 may be varied to achieve desired characteristics. For example, larger particle size and relatively narrow particle size distribution may increase the interstitial volume of the particulate media 32, which may, correspondingly, increase the quantity of oxygen which may be entrained in the particulate media 32. However, the larger particle size and relatively narrow particle size distribution may reduce the contact surface area between the interior of the housing 22 and the particulate media 32, between the particulate media 32 and the temperature sensing element 24, and even between adjacent particles of the media 32. The relatively lower contact surface areas may reduce the efficacy of the particulate media 32 as a thermal pathway between the housing 22 and the temperature sensing element 24.

In one embodiment, the particulate media 32 may include a mixture of particle sizes to control oxygen content and thermal response of the temperature sensor 16. Smaller particles may at least partially lie in the interstices of the larger particles, thereby increasing the efficacy of the thermal pathway while still providing open interstitial volume for the entrainment of oxygen. The particular particle grain size(s) used in an embodiment may depend on the size and configuration of the sensor, housing, and sensing element 24. In one embodiment, the smaller particles may be about 71% or less of the mesh size of the larger particles. In another embodiment the smaller particles may be about 50% or less of the mesh size of the larger particles. For example, a blend of grain sizes including grains (e.g. magnesium oxide grains) of +100 mesh and +200 mesh may be used. In another example, a blend of grain sizes including +100 mesh, +140 mesh, +200 mesh and −200 mesh grains may be used.

A temperature sensor 16 consistent with the present invention may be manufactured to enhance various characteristics, such as the ability to maintain an oxygen concentration above a threshold concentration to prevent or reduce degradation. For example, the interior surfaces of the housing 22 may be passivated to reduce the reactivity of the housing 22. The reduced reactivity of the housing 22 may reduce oxygen loss due to oxidation of the housing 22.

In one such embodiment, the interior surfaces of the housing 22 may be pre-oxidized. Pre-oxidization may be achieve by any known method including, for example, exposure to oxygen, treatment with a chemical oxidizing agent, etc. Pre-oxidation may prevent moisture contamination and further oxidation once the housing with the sensor element therein is closed to the outside atmosphere.

In another aspect, the housing 22 of the temperature sensor 16 may be vibration filled to allow settling of the particulate media 32. For example, with the temperature sensing element 24 at least partially inserted in the housing 22, the housing 22 may be vibrated as the particulate media 32 is introduced into the housing 22. In another embodiment, the housing 22 may be at least partially filled with the particulate media 32. The housing 22 with the particulate media 32 may be vibrated as the temperature sensing element 24 is at least partially inserted into the housing 22. Vibration of the housing 22 and the particulate media 32 may at least partially fluidize the particulate media 32 facilitating insertion of the temperature sensing element 24 and settling of the particulate media 32 around the temperature sensing element 24. The use of vibration filling techniques may allow proper settling of the particulate media 32 and may increase the physical protection of the temperature sensing element 24 as well as thermal conductivity provided by the particulate media 32. Of course, other operations may be used for providing the particulate media disposed at least partially around the temperature sensing element in the housing.

According to one aspect, a temperature sensor consistent with the present disclosure may provide oxygen entrained within a particulate media, such as magnesium oxide or other selected constituents, which may surround a temperature sensing element in a closed housing. The closed environment of the housing may protect the temperature sensing element and maintain the temperature sensing element in an environment provided within the interior volume of the housing. Additionally, the closed environment provided by the housing may prevent infiltration of contaminants. The oxygen entrained in the interstitial volume of the particulate media may provide a sufficient quantity of oxygen to reduce the degradation of the temperature sensing element, e.g., due to a reducing environment. The particulate media may also provide a thermal pathway between the housing and the temperature sensing element, which may provide a satisfactory thermal response of the temperature sensor. The particulate media may be generally non-reactive in nature and the interior surfaces of the housing, and in some embodiments the particulate media itself, may be pre-oxidized to reduce the depletion of oxygen within the closed environment of the housing as a result of continuing oxidation of the media or of the housing.

According to another aspect there is provided a temperature sensor including: a housing; a temperature sensing element disposed in the housing; and a particulate media disposed in the housing and at least partially around the temperature sensing element. The particulate media includes a blend of first particles and second particles, the second particles having a size smaller than first particles, whereby an interstitial volume is established between the first particles and second particles for entraining an amount of oxygen sufficient to avoid a reducing atmosphere in the housing.

According to another aspect there is provided a temperature sensor including: a housing; a temperature sensing element disposed in the housing; the temperature sensing element including a resistive temperature detector including a metal film disposed on at least one substrate; a particulate media disposed in the housing and at least partially around the temperature sensing element; and a body portion, the housing being coupled to the body portion to seal the temperature sensing element and the particulate media therein. The particulate media includes a blend of first particles and second particles, the second particles having a size of about 71% or less of the size of the first particles. The particulate media establishes an interstitial volume between the first particles and second particles for entraining an amount of oxygen sufficient to avoid a reducing atmosphere in the housing.

According to yet another aspect there is provided a temperature sensor including: a housing; a temperature sensing element disposed in the housing, the temperature sensing element including a resistive temperature detector including a metal film disposed on at least one substrate, and a particulate media disposed in the housing and at least partially around the temperature sensing element. The particulate media includes a blend of first particles and second particles, the second particles having a size of about 71% or less of the size of the first particles. The particulate media establishes an interstitial volume between the first particles and second particles for entraining oxygen.

According to yet another aspect there is provided a method of reducing degradation of a temperature sensor including: pre-oxidizing interior surfaces of a housing; disposing the temperature sensing element in a housing; providing a particulate media in the housing and at least partially around the temperature sensing element, the particulate media providing an interstitial volume; and entraining oxygen in the interstitial volume.

According to a further aspect there is provided a system including: an engine; an exhaust system configured to carry exhaust gases from the engine; a temperature sensor coupled to the exhaust system for detecting a temperature of the exhaust gases; and a vehicle control system configured to controlling at least one operating parameter of the engine in response to an output of the temperature sensor. The temperature sensor includes: a housing; a temperature sensing element disposed in the housing; and a particulate media disposed in the housing and at least partially around the temperature sensing element. The particulate media includes a blend of first particles and second particles, the second particles having a size smaller than first particles, whereby an interstitial volume is established between the first particles and second particles for entraining an amount of oxygen sufficient to avoid a reducing atmosphere in the housing.

The features and aspects described with reference to particular embodiments disclosed herein may be susceptible to combination and/or application in various other embodiments described herein. Such combinations and/or applications of such described features and aspects to such other embodiments are contemplated herein. Additionally, the embodiments disclosed herein are susceptible to numerous variations and modifications without materially departing from the spirit of the disclosed subject matter. Accordingly, the invention herein should not be considered to be limited to the particular embodiments disclosed herein.

What is claimed is:

1. A method of reducing degradation of a temperature sensor comprising:
   pre-oxidizing an interior surface of a housing;
   disposing a temperature sensing element in said housing;
   providing a particulate media in said housing and at least partially around said temperature sensing element, said particulate media providing an interstitial volume; and
   entraining and amount of oxygen in said interstitial volume sufficient to avoid a reducing atmosphere in said housing,
   wherein said particulate media comprises a blend of first particles and second particles, said second particles having a mesh size smaller than a mesh size of said first particles and wherein said interstitial volume is between said first particles and said second particles, and
   wherein said first and second particles comprises the same material.

2. A method according to claim 1, wherein said second particles have a mesh size of about 71% of the mesh size of said first particles.

3. A method according to claim 1, wherein said second particles have a mesh size of about 50% or less of the mesh size of said first particles.

4. A method according to claim 1, said method further comprising sealing said housing to provide a closed environment around said temperature sensing element and said particulate media.

5. A method according to claim 1, said method further comprising vibrating at least one of said housing or said temperature sensing element to achieve a packing density of said particulate media.

6. A method according to claim 1, wherein said temperature sensing element comprises a resistive temperature detector comprising a metal film disposed on at least one substrate.

7. A method according to claim 1, wherein at least one of said first and second particles comprises a material selected from the group consisting of: magnesium oxide, alumina, calcium oxide, titanium oxide, manganese oxide, boric oxide.

8. A method according to claim 1, wherein at least one of said first and second particles comprises a ceramic material.

* * * * *

UNITED STATES PATENT AND TRADEMARK OFFICE
CERTIFICATE OF CORRECTION

PATENT NO. : 7,931,401 B2  Page 1 of 1
APPLICATION NO. : 12/389739
DATED : April 26, 2011
INVENTOR(S) : Landis et al.

It is certified that error appears in the above-identified patent and that said Letters Patent is hereby corrected as shown below:

In column 7, line 17, delete "and" and insert --an--.

Signed and Sealed this
Twenty-sixth Day of July, 2011

David J. Kappos
*Director of the United States Patent and Trademark Office*